K. LUTIGER.
CALIPER GAGE.
APPLICATION FILED DEC. 22, 1917.

1,292,340.

Patented Jan. 21, 1919.
3 SHEETS—SHEET 1.

Witnesses
Norris L. Sumby.

Inventor
Kaspar Lutiger
By
Attorney

K. LUTIGER.
CALIPER GAGE.
APPLICATION FILED DEC. 22, 1917.

1,292,340.

Patented Jan. 21, 1919.
3 SHEETS—SHEET 2.

Witnesses:
Norris L. Sumby

Inventor
Kaspar Lutiger
by
Attorney

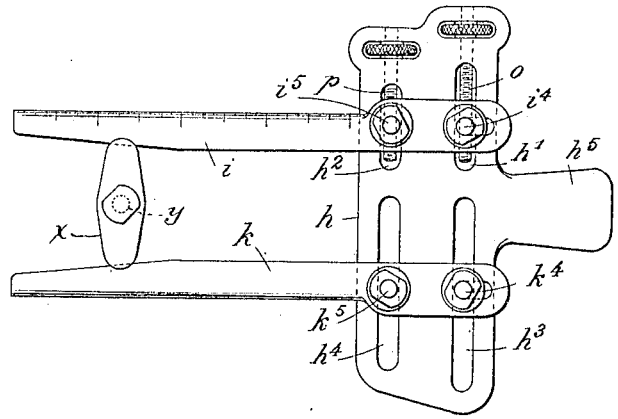
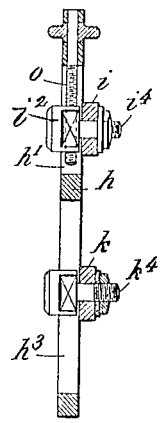
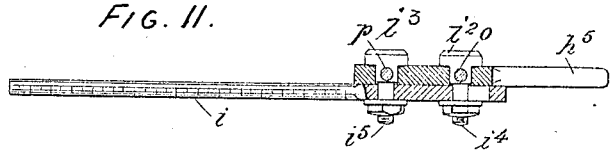
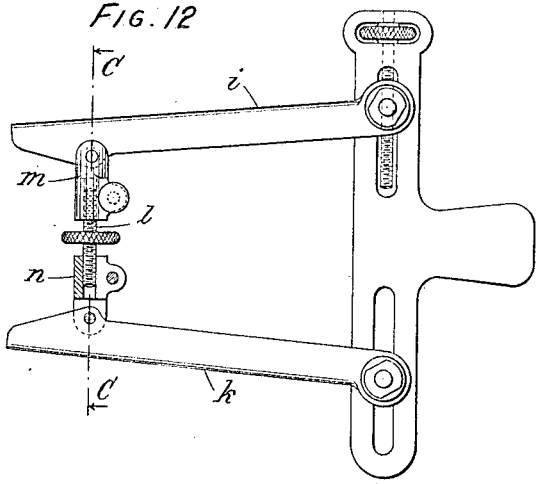
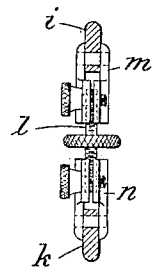

UNITED STATES PATENT OFFICE.

KASPAR LUTIGER, OF DARTFORD, ENGLAND, ASSIGNOR OF ONE-HALF TO LOUIS SCHILLIG, OF CRAYFORD, ENGLAND.

CALIPER-GAGE.

1,292,340.

Specification of Letters Patent. Patented Jan. 21, 1919.

Application filed December 22, 1917. Serial No. 208,470.

*To all whom it may concern:*

Be it known that I, KASPAR LUTIGER, a citizen of the Swiss Confederation, residing at Dartford, England, have invented certain new and useful Improvements in Caliper-Gages, of which the following is a specification.

This invention has for its object, to provide a caliper gage which is suitable for accurately and rapidly measuring the diameter of cylindrical shafts or the width of cylindrical cavities and also the angle or conicity of conical shafts or openings.

For this purpose the measuring instrument chiefly comprises a pair of rails having straight edges situated in the same plane, one of the rails being provided with means for adjustably securing it at two points in its position with regard to the other rail, while the second rail is either permanently fixed or is provided with means for adjustably securing its position with regard to the first rail, a screw spindle device adapted to vary the relative position of the two rails, and a base-plate or holder provided with a handle and adapted to serve as a support and guide for the rails and for the screw spindle device.

The means for adjustably securing the rails are preferably pivotal joints mounted in slots of the base-plate, and the screw spindle device is a screw spindle held in the base-plate and adapted to vary the position of one of the two pivotal joints, or a pair of screw spindles adapted to vary the position of the two pivotal joints independently of each other.

In further describing my invention reference will be made to the accompanying drawings, of which:—

Fig. 9 is a face view of a caliper gage for measuring the cavity of hollow objects.

Fig. 10 is a vertical section of the same and

Fig. 11 is a horizontal section of the same.

Fig. 12 is a face view of a modification.

Fig. 13 is a section along line C—C of Fig. 12.

Fig. 14 shows a modification of Fig. 9.

Figure 1:
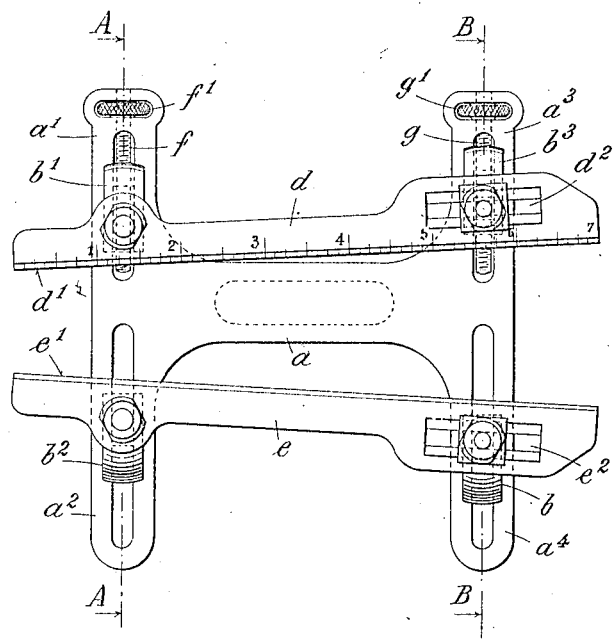
Figure 1 is a face view of a caliper gage for measuring cylindrical or conical objects.
Figure 2:
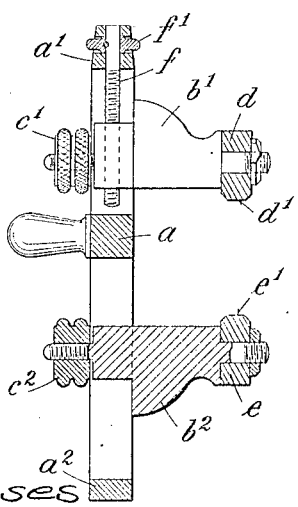
Fig. 2 is a section along line A—A of Fig. 1.
Figure 3:
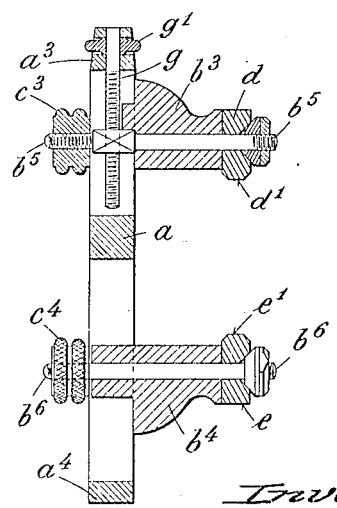
Fig. 3 is a section along line B—B of Fig. 1.

The base plate $a$ shown by Figs. 1–3 has at each end an upper arm $a^1$ or $a^3$ and a lower arm $a^2$ or $a^4$, each of which is provided with a slot for guiding a sliding block $b^1$, $b^2$, $b^3$ or $b^4$ overlapping the slot and capable of being fixed in the desired position by means of a screw nut $c^1$, $c^2$, $c^3$, or $c^4$.

On the upper blocks $b^1$ and $b^3$ is mounted a straight-edged rail $d$ and on the lower blocks $b^2$ and $b^4$ a straight-edged rail $e$ by means of pivotal joints. $d^1$ and $e^1$ are the straight edges or faces of the said rails between which the object to be measured is placed.

The block $b^1$ is held in the slot by a screw-spindle $f$ guided in the arm $a^1$ of the base plate and is adjustable by means of the said spindle and its head $f^1$. The block $b^3$ is adjustable by means of a screw-spindle $g$ and head $g^1$, and the rail $d$ may be provided with a graduated scale.

For measuring conical objects, the rail $e$ has a slot $e^2$ and a similar slot $d^2$ may be provided also in the rail $d$.

The base plate, sliding blocks and rails may be held together by means of screw studs and nuts in the manner shown by Fig. 2, but preferably by means of transverse screw spindles such as $b^5$ and $b^6$ shown by Fig. 3, and the front edges of the slots $d^2$ and $e^2$ are preferably beveled to fit a beveled rectangular washer under the nuts of the screw-threaded heads of the bolts $b^5$ and $b^6$.

Figure 4:
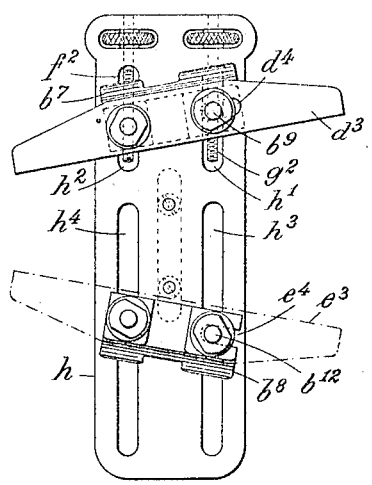
Fig. 4 is a face view of a modified construction.
Figure 5:
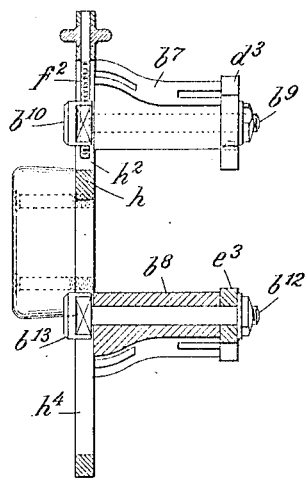
Fig. 5 is a section of the same.

According to the modification represented by Figs. 4 and 5 the blocks $b^1$ and $b^3$ are replaced by a single block $b^7$, and the blocks or distance pieces $b^2$ and $b^4$ by a single block or distance piece $b^8$, the height or length of which is determined by the diameter of the largest piece of work to be inserted between the two straight edges. To permit the necessary adjustment the rails $d^3$ and $e^3$ are provided with slots, such as $d^4$ and the blocks $b^7$ and $b^8$ are provided with slots, such as $e^4$ through which pass the bolts $b^9$ and $b^{12}$.

The screw spindles $b^5$ and $b^6$ are replaced by bolts $b^9$ and $b^{12}$ provided at their inner ends with cylindrical heads $b^{10}$ and $b^{13}$ which overlap the slot of the base plate and have a pair of flat faces fitting into the slots $h^1$, $h^2$, $h^3$ and $h^4$ of the base plate $h$.

The heads of the two bolts serving to clamp the upper rail $d^3$ also serve as screw nuts to mesh with the micrometer screw spindles $f^2$ and $g^2$. The base plate is also provided with a handle.

Figure 6:
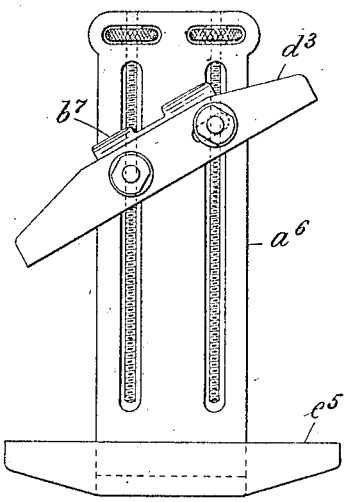
Fig. 6 is a face view of a further modification.
Figure 7:
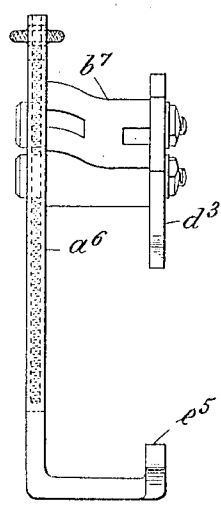
Fig. 7 is a side view of the same.

According to Figs. 6 and 7 the instrument may be further simplified by making the lower rail $e^5$ integral with the base plate $a^6$ or permanently fixing it to the same.

Figure 8:
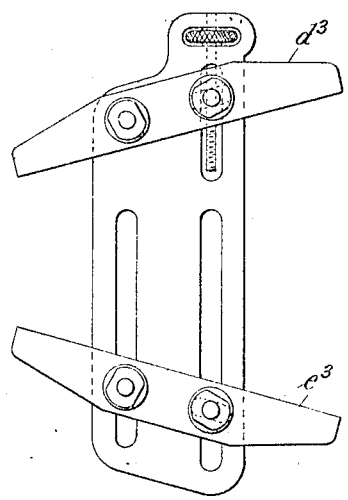
Fig. 8 is a face view of a third modification.

According to the modification represented by Fig. 8 one of the two micrometer spindles or adjusting screw spindles ($f^2$) is omitted, which form may be sufficient for measuring conical objects.

In the modification represented by Figs. 9, 10 and 11 the upper rail $i$ is fixed to the base plate $h$ at two points by means of pivotal sliding blocks $i^2$ and $i^3$ which are adjustable in the slots $h^1$, $h^2$ of the base plate $h$ by means of screw-spindles $o$ and $p$, and fixed in the desired position by clamping screws, and the lower rail $k$ is fixed to the base plate $h$ at two points by means of sliding blocks similar to the blocks $i^2$ and $i^3$ and adjustable in slots $h^3$ and $h^4$. Each of the said blocks forms the head of a screw stud $i^4$, $i^5$, $k^4$ or $k^5$ adapted to serve as a pivot for one of the rails. The ends of the rails nearest to the handle $h^5$ have longitudinal slots for allowing the necessary adjustment.

As indicated by Fig. 9 if the rails have considerable length, the outer ends may be secured in the required position by an additional clamping device, consisting for instance of a pair of clamping plates, one of which is indicated at $x$, these plates being clamped against opposite sides of the rails by a screw $y$, thus preventing accidental relative movement between the adjacent ends of the rails.

Figs. 12 and 13 show a modification of such a clamping device, in which a screw spindle $l$ is used for forcing the rails $i$ and $k$ apart or drawing them together, by means of a pair of split screw nuts $m$ and $n$ hinged to the rails.

The rails $i$ and $k$ may be bent at one end as indicated by Fig. 14, in order to reduce the height of the base plate.

The constructions shown by Figs. 4 and 5, and by Figs. 9, 10 and 11 are those, which I use in preference to the others, which may only be used in certain cases, for instance for measuring only conical objects, or where either accuracy or cheapness or rapidity is not essential.

In each embodiment of the invention shown, the distance between the rails may be varied while the angular relation between the rails is maintained, or, the angular relation between the rails can be varied while the distance between them is maintained, or, both the distance between the rails and their angular relation may be simultaneously varied by correspondingly adjusting the position of at least one of the rails with respect to the base plate.

What I claim is:—

1. In caliper gages, the combination of a base plate, a pair of straight-edged rails coöperative therewith, one of said rails being adjustable relative to the base plate to vary the distance between the rails, means connected to the base plate for clamping the adjustable rail at two points of its length, and means by which the angle and the distance between the rails can be varied.

2. In caliper gages, the combination of a base plate, a pair of straight-edged rails adjustable relatively to the base plate to vary the distance between the rails, means coöperative with the base plate for clamping said rails at two points of their lengths, and means including as an element a screw-spindle device adapted to act on the clamping means for one of said rails for varying the distance and angle between the two rails.

3. In caliper gages, the combination of a base plate, a pair of straight-edged rails adjustable relatively to the base plate to vary the distance between the rails, pivotal clamping means engaging the base plate and adapted to receive the said rails at two points of their lengths, and means including as an element a screw-spindle device adapted to act on the clamping means for one of said rails to vary the distance and angle between the two rails.

4. In caliper gages, the combination of a slotted base plate, a pair of straight-edged rails adjustable relatively to the base plate to vary the distance between the rails, pivotal clamping means adapted to be guided along the slots of the said base plate and to secure the said rails at two points of their lengths, and means including as an element a screw-spindle device secured in the said base plate and adapted to act on the clamping means for one of said rails for varying the position of said clamping means along its respective slots.

5. In caliper gages comprising a pair of rails having straight edges situated in the same plane and having a longitudinal slot in each rail, a base plate having two pairs of slots at right angles to the normal position of the rails, blocks adapted to be guided in the said slots and to serve as pivotal joints for varying the angle between the rails, and a pair of screw-spindles secured to the said base plate and adapted to vary the position of the said blocks along the slots of the base plate.

In testimony whereof I have hereunto set my hand in presence of a subscribing witness.

KASPAR LUTIGER.

Witness:
J. WETTER.